(12) United States Patent
Schmidt et al.

(10) Patent No.: US 10,220,328 B2
(45) Date of Patent: Mar. 5, 2019

(54) COMBINED MULTI EFFECT DISTILLATION SYSTEM

(76) Inventors: Yaniv Schmidt, Hod Hasharon (IL); Joseph Newman, Bnei Brak (IL); Herman Weiss, Tel Aviv (IL)

( * ) Notice: Subject to any disclaimer, the term of this patent is extended or adjusted under 35 U.S.C. 154(b) by 1096 days.

(21) Appl. No.: 14/007,968

(22) PCT Filed: Mar. 19, 2012

(86) PCT No.: PCT/IB2012/051306
§ 371 (c)(1),
(2), (4) Date: Oct. 22, 2014

(87) PCT Pub. No.: WO2012/127406
PCT Pub. Date: Sep. 27, 2012

(65) Prior Publication Data
US 2015/0075968 A1     Mar. 19, 2015

(30) Foreign Application Priority Data
Mar. 21, 2011  (GB) .................................. 1104718.0

(51) Int. Cl.
*B01D 3/14*   (2006.01)
*B01D 3/06*   (2006.01)
*B01D 1/26*   (2006.01)
*C02F 1/04*   (2006.01)
*C02F 1/16*   (2006.01)
*C02F 1/06*   (2006.01)
*C02F 103/08*   (2006.01)

(52) U.S. Cl.
CPC .............. *B01D 3/146* (2013.01); *B01D 1/26* (2013.01); *B01D 3/065* (2013.01); *B01D 3/148* (2013.01); *C02F 1/04* (2013.01); *C02F 1/16* (2013.01); *C02F 1/048* (2013.01); *C02F 1/06* (2013.01); *C02F 2103/08* (2013.01); *C02F 2303/10* (2013.01); *Y02A 20/128* (2018.01)

(58) Field of Classification Search
CPC .......... B01D 1/26; B01D 3/065; B01D 3/146; C02F 1/04
See application file for complete search history.

(56) References Cited

U.S. PATENT DOCUMENTS

| | | |
|---|---|---|
| 3,257,290 A | 6/1966 | Starmer |
| 3,303,106 A | 2/1967 | Standiford |
| 3,351,120 A | 11/1967 | Goeldner et al. |
| 4,018,656 A | 4/1977 | Rogers et al. |

FOREIGN PATENT DOCUMENTS

JP    WO2008/0142810 A1    11/2008

OTHER PUBLICATIONS

International Search Report dated Jul. 11, 2012.

*Primary Examiner* — Renee Robinson
(74) *Attorney, Agent, or Firm* — Symbus Law Group, LLC; Clifford D. Hyra

(57) ABSTRACT

A compound multi effect distillation (MED) system of integrated backward and forward fed MED systems. Heated concentrate from the hottest effect of the backward fed MED system is delivered as feed to the hottest effect in the forward fed MED system, to generate a more concentrated brine than possible using any of the systems alone. Furthermore, coupling the systems creates additional operational advantages and increases distillation efficiency.

20 Claims, 5 Drawing Sheets

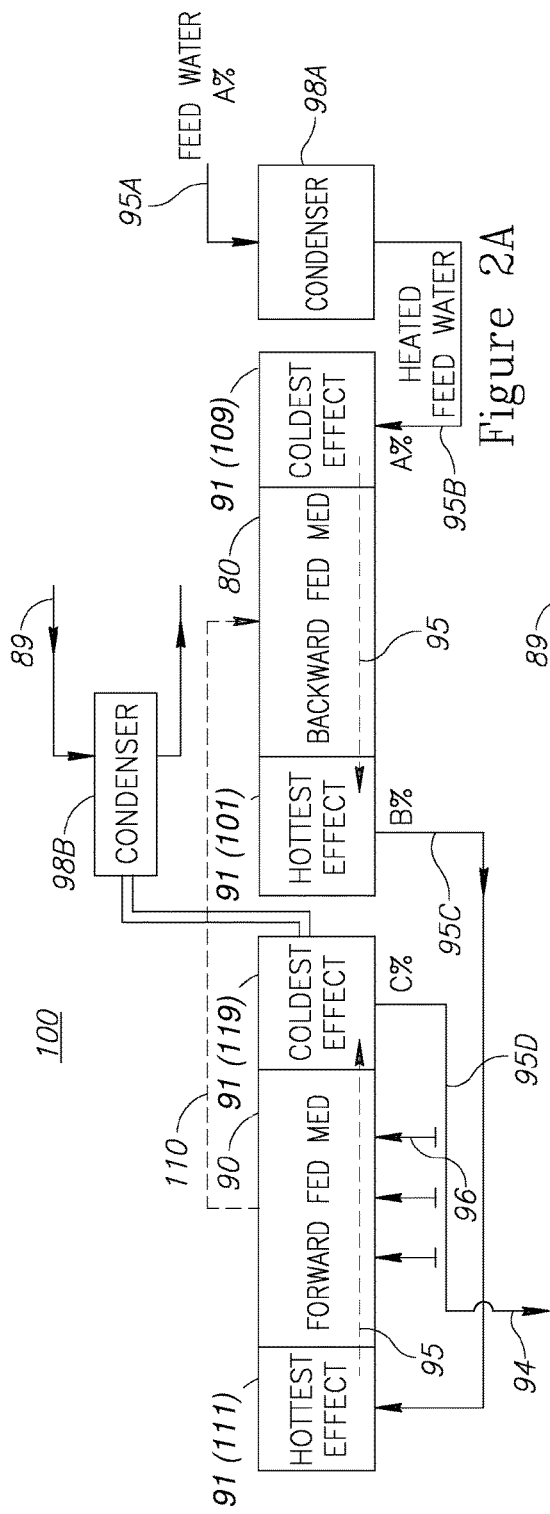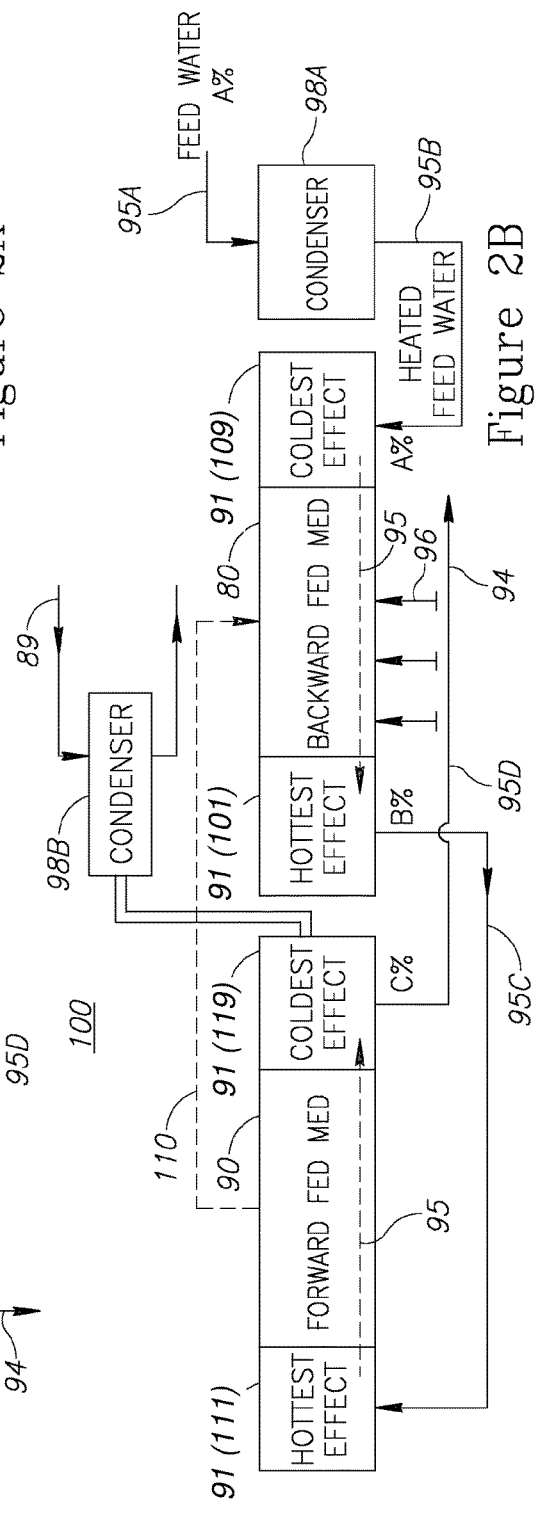

COMBINED MULTI EFFECT DISTILLATION SYSTEM

BACKGROUND

1. Technical Field

The present invention relates to the field of desalination, and more particularly, to multi effect distillation (MED).

2. Discussion of Related Art

Multi effect distillation (MED 80 and 90, FIGS. 1A and 1B) uses condensation heat of water vapor 97 to evaporate feed water 95 and thereby distill them to product water 93 with resulting brine 94. Heat exchange is carried out in effects 91 arranged serially, each effect 91 receives the evaporated feed water from the former effect as water vapor. The sequential evaporation and condensation processes are carried out over a gradient from a hottest effect 101, 111 to a coldest effect 109, 119, and are used to maximize distillation for heat investment.

Feed water is warmed (from 95A to 95B) in condenser 98 before entering the effects 91, in order to increase the efficiency of the process. Condenser 98 commonly comprises a falling film condenser for heating the feed water and a forced circulation condenser for condensing residual vapor from the MED.

Several feed methods of the feed water are known: simultaneous feed—(i) introducing the warmed feed water simultaneously into all effects, (ii) backward feed (MED 80, FIG. 1A)—heated feed brine 95B is introduced into the coldest effect 109 and from each effect to a hotter effect (via 95E), resulting in the most concentrated feed water entering the hottest effect 101, and (iii) forward feed (MED 90, FIG. 1B)—heated feed brine 95B (heated by feed heaters 99 using vapor from effects 91-99A) is introduced into the hottest effect 111 and from each effect to a colder effect (via 95E), resulting in the most concentrated feed brine entering the coldest effect 119 (see, e.g. WO2006/095340). Flash chambers 96 may be added to extract some more vapor from brine 94 into effects 91.

Additionally, effects 91 may be grouped to enhance pumping efficiency of the feed water and brine streams, such that the feed water is introduced to effects groupwise.

British Patent GB 1174423 discloses a mixed feed plant, in which hot brine effluent from the first effect of the backward feed stage is carried by line to an interstage heat exchanger through which the effluent passes and is thereafter conveyed by line to the first effect of the forward feed section, and in which the vapour produced in the last effect of the backward feed stage is employed to heat the first effect of the forward feed stage.

BRIEF SUMMARY

Embodiments of the present invention provide a compound multi effect distillation (MED) system comprising: a backward fed MED system, comprising a condenser arranged to heat feed water and deliver the heated feed water to a coolest effect in the backward fed MED system, wherein each effect in the backward fed MED system is arranged to evaporate water from received feed water and deliver heated concentrate to a warmer effect, to yield hottest concentrate from a hottest effect of the backward fed MED system; and a forward fed MED system, arranged to deliver the hottest concentrate obtained from the hottest effect of the backward fed MED system, to a hottest effect in the forward fed MED system, wherein each effect in the forward fed MED system is arranged to evaporate water from received concentrate and deliver cooled concentrate to a colder effect, to yield coldest and most concentrated brine from a coldest effect of the forward fed MED system.

BRIEF DESCRIPTION OF THE DRAWINGS

The present invention will be more readily understood from the detailed description of embodiments thereof made in conjunction with the accompanying drawings of which:

FIGS. 2A and 2B are high level schematic block diagrams of a compound multi effect distillation (MED) system, according to some embodiments of the invention;

DETAILED DESCRIPTION

Figure 1A:
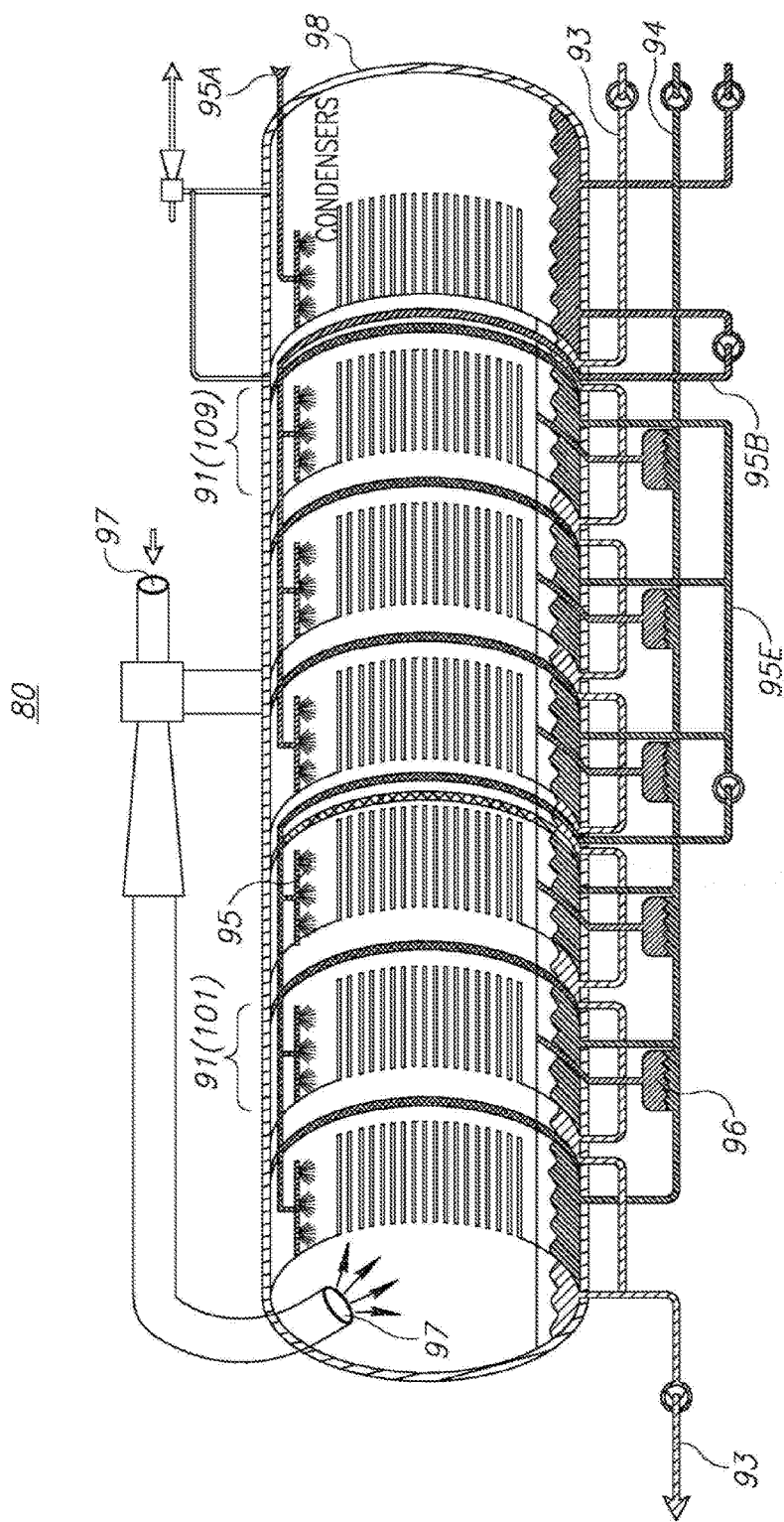
FIGS. 1A and 1B are schematic illustrations of multi effect distillation (MED) systems according to the prior art.
Figure 1B:
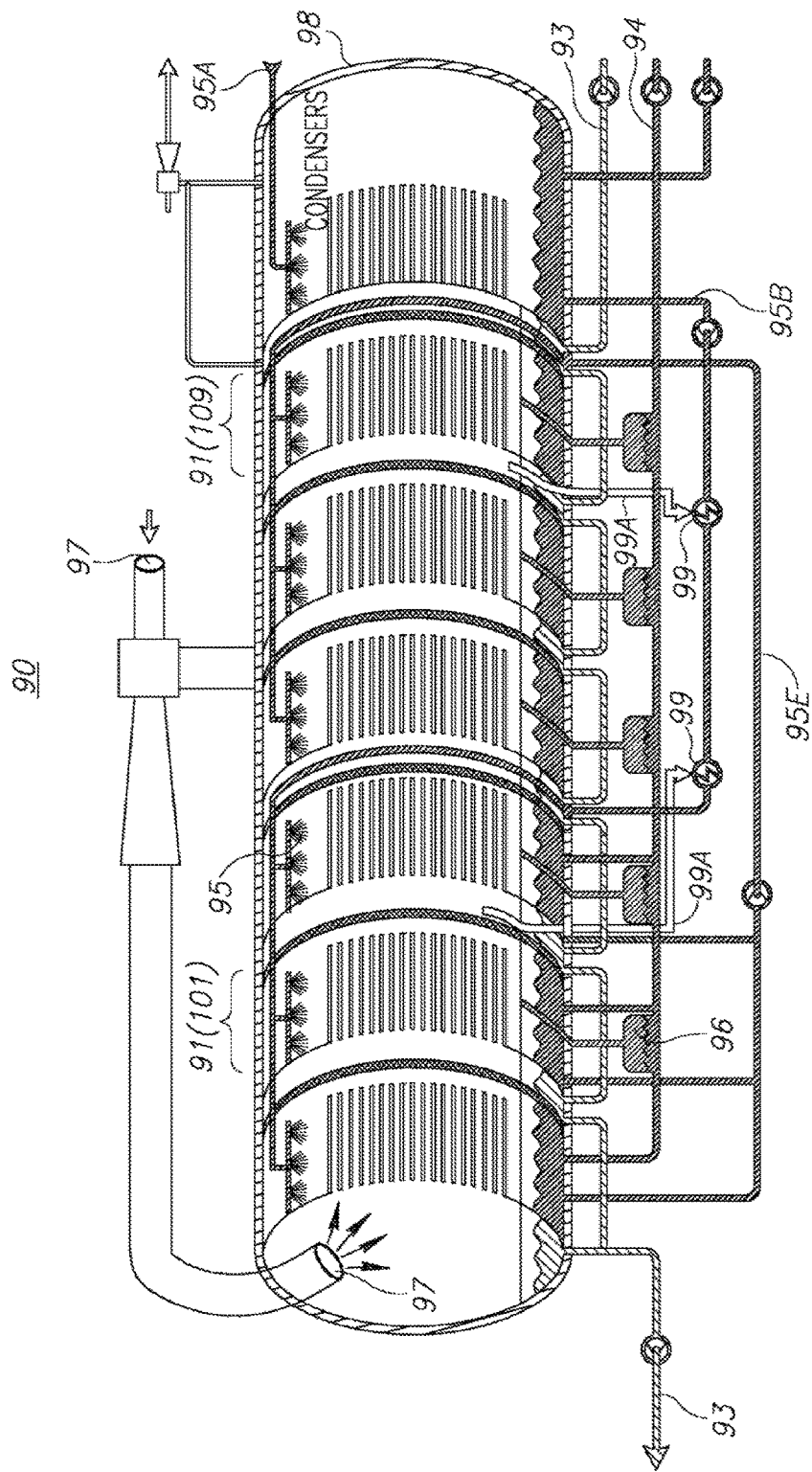

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 3:
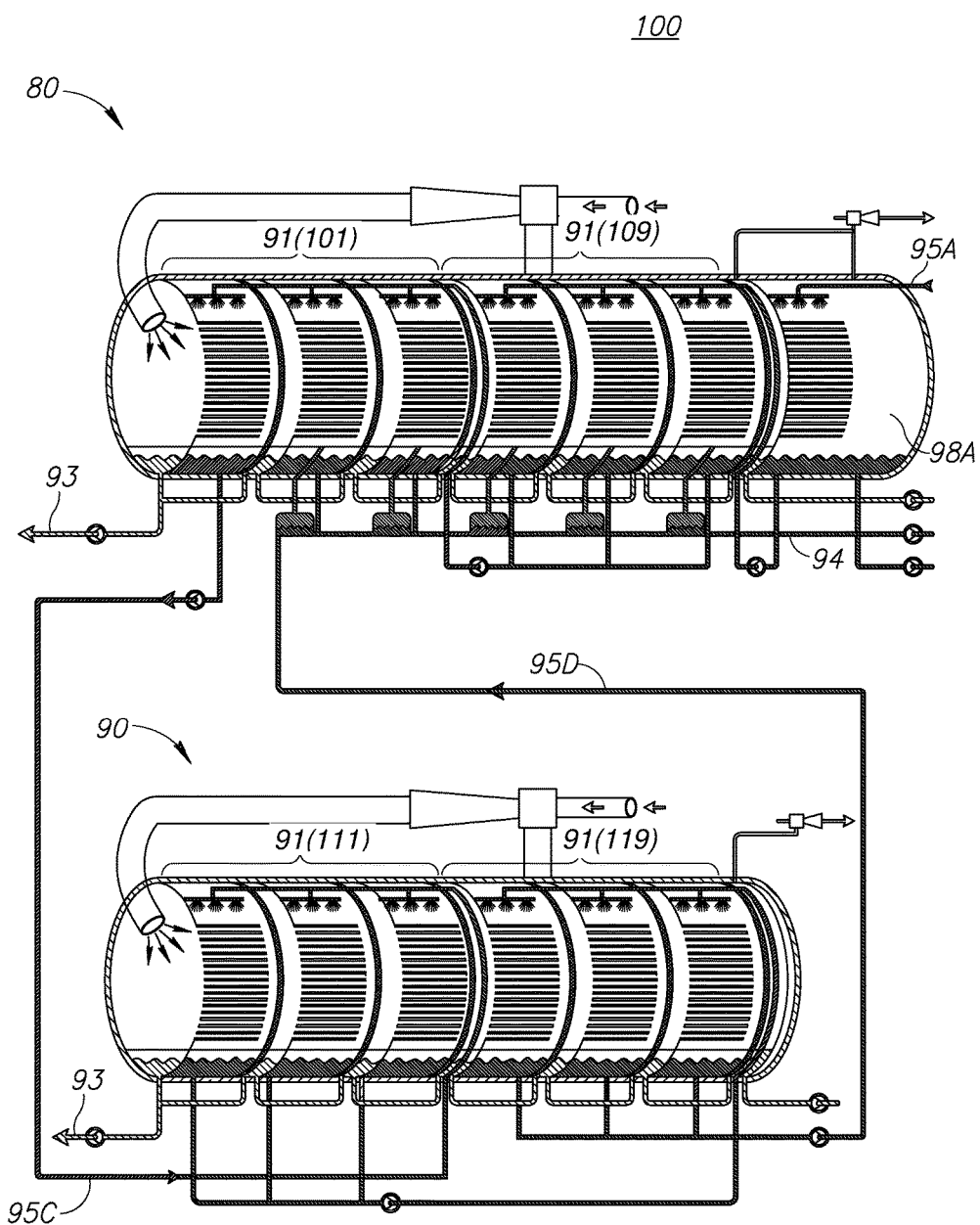
FIG. 3 is a schematic illustration of a compound multi effect distillation (MED) system, according to some embodiments of the invention.

FIGS. 2A and 2B are high level schematic block diagrams of a compound multi effect distillation (MED) system 100, according to some embodiments of the invention. FIG. 3 is a schematic illustration of compound multi effect distillation (MED) system 100, according to some embodiments of the invention.

Compound MED system 100 comprises a backward fed MED system 80 integrated with a forward fed MED system 90.

Backward fed MED system 80 comprises condenser 98 arranged to heat feed water 95A and deliver heated feed water 95B to coolest effect 109 in backward fed MED system 80. Each effect 91 in backward fed MED system 80 is arranged to evaporate water from received feed water 95 and deliver heated concentrate to a warmer effect 91 (see right broken arrow 95 in FIGS. 2A and 2B), to yield hottest concentrate 95C from hottest effect 101 of backward fed MED system 80.

Forward fed MED system 90 is arranged to deliver hottest concentrate 95C obtained from hottest effect 101 of backward fed MED system 80, to hottest effect 111 in forward fed MED system 90. No condenser 98 and no feed heaters 99 are required for forward fed MED system 90 as feed water is heated by backward fed MED system 80. Each effect 91 in forward fed MED system 90 is arranged to evaporate water from received concentrate and deliver cooled concentrate to a colder effect 91 (see left broken arrow 95 in FIGS. 2A and 2B), to yield coldest and most concentrated brine 95D from coldest effect 119 of forward fed MED system 90.

In embodiments, a falling film condenser 98A is used to heat feed water to backward fed MED system 80, while a forced circulation condenser 98B is spared in backward fed MED system 80, as hottest concentrate 95C is supplied to forward fed MED system 90.

In embodiments, a forced circulation condenser 98B using cooling water 89 is used to condense residual vapor from forward fed MED system 90. Alternatively residual vapor can be provided to backward fed MED system 80, e.g. via a vapor transfer unit 110 (see below).

Using falling film condenser 98A to heat feed water supplied to backward fed MED system 80 and forced circulation condenser 98B to condense residual vapor from forward fed MED system 90 replaces prior art that uses both condensers in both MED types. Hence, this embodiment of the current invention spares one condenser for each MED subsystem.

Forward fed MED system 90 may further comprise a plurality of serially arranged flash chambers 96 arranged to deliver additional vapor from the yielded coldest most concentrated brine 95D to either the effects 91 of forward fed MED system 90 (FIG. 2A) or the effects 91 of backward fed MED system 80 (FIG. 2B). The latter possibility returns vapor 97 to system 80, in place of vapor from brine 94 supplied in prior art backward fed MED system 80 (FIG. 1A). Coldest most concentrated brine 95D is then removed from system 100 as brine 94.

System 100 further comprises pumps (shown, not numbered) for pumping the fluids in the illustrated directions. System 100 further comprises pipelines for directing the flows in the system. These pipelines may be identified by the same numerals that denote the actual fluids that flow (see e.g. FIG. 3), such as in concentrate 95, product water 93, brine 94, water vapor 97, cooling water 89, feed water 95A, heated feed water 95B, hottest concentrate 95C and coldest most concentrated brine 95D, as denoted e.g. in FIGS. 2A and 2B. Corresponding pipes 89, 93, 94, 97, 95, 95A, 95B, 95C and 95D are hence part of system 100 and deliver the corresponding flows from corresponding inlets to corresponding outlets.

Effects 91 may be grouped (as illustrated in FIG. 3) to optimize the number of pumps and the amounts of supplied feed water to effects 91. In cases of grouped effects 91, hottest effects 101, 111 and coldest effects 109, 119 may be replaced by corresponding hottest and coldest effect groups. For example, in FIG. 3 hottest groups are designated by 101, 111 and coldest groups by 109, 119. Additional effects 91 and effect groups are constructed between theses hottest and coldest groups, and are not shown in FIG. 3 for clarity reasons alone. Large distillation facilities may comprise tens of effects 91 variously grouped according to operation consideration. FIGS. 2A, 2B illustrate these intermediate effects by the middle section of systems 80, 90.

Additionally or alternatively, compound MED system 100 may further comprise a vapor transfer unit 110, as shown in FIGS. 2A and 2B, arranged to transfer specified amounts of vapor from specified effects 91 in forward fed MED system 90 to specified effects 91 in backward fed MED system 80, to optimize vapor amount in both systems 80, 90. Vapor transfer unit 110 may balance groups of effects to operate at optimal temperature and pressure conditions.

Forward fed MED system 90 and backward fed MED system 80 may be arranged to operate at a same maximal temperature of their respective hottest effects 111, 101 (respectively) e.g. 70° C. Alternatively, forward fed MED system 90 may be arranged to operate at a higher maximal temperature (e.g. 80° C.) than backward fed MED system 80, in respect to their respective hottest effects 111, 101 (respectively). Feeding hottest concentrate 95C to hottest effect 111 at a lower concentration than the final coldest and most concentrated brine 95D, avoids some of the potential corrosion and scaling damage.

For example, hottest concentrate 95C from hottest effect 101 of backward fed MED system 80 may have a double concentration in respect to feed water 95A, for example 8% (B %) in respect to 4% (A %) in case of sea water. Most concentrated brine 95D from coldest effect 119 of forward fed MED system 90 may have a threefold concentration in respect to feed water 95A, for example 12% (C %) in respect to 4% (A %) in case of sea water. Such a high concentration is not achievable in prior art MED systems, and is usable to reduce returned brine 94, increase distillation efficiency, and enhance the usability of brine 94, all three aspects being a large economic benefit in comparison to prior art MED plants. The feed water may comprise waste water or brackish water, in which case a highly efficient product water extraction can be carried out, with significantly smaller amounts of generated brine, due to its higher concentration.

In another example, feed water may be supplied at 3-5% (A %) or even lower in case of industrial rejects or wastewater, and at 30-50° C., concentrated in backward fed MED system 80 to about 4-6% (B %) respectively, at temperatures in the range of 60-80° C., transferred as hot concentrate 95C to forward fed MED system 90 in which it is cooled back to the range of 40-50° C. and further concentrated to the range 8-12% (C %) to exit the system as brine 95D (possibly after additional flashing).

Advantageously, the coupling of systems 80, 90 allows a more effective distillation than with either backward or forward fed MED systems (80, 90 respectively) in the following aspects: (i) generation of a most concentrated brine 95D, 94 which is more concentrated than the brine exiting systems 80, 90 separately, allows both a better utilization of brine 94 as a product of system 100 as well as increasing the amount of product water 93 in respect to feed water 95A, which is usable especially in systems 100 that are limited in feed water and brine disposal possibilities, (ii) reduction of corrosion and scaling in respect to backward fed MED system 80, by feeding the hottest effects 111 with hottest concentrate 95C. Alternatively, the temperature of the hottest effect 111 may be raised beyond temperatures that can be achieved in the prior art. (iii) warming hottest concentrate 95C is carried out by backward fed MED system 80 and does not require additional investment of energy. Finally, (iv) vapor management may be carried out more efficiently due to the possibility to profit from the relative strengths of systems 80, 90 while avoiding their relative weaknesses.

Figure 4:
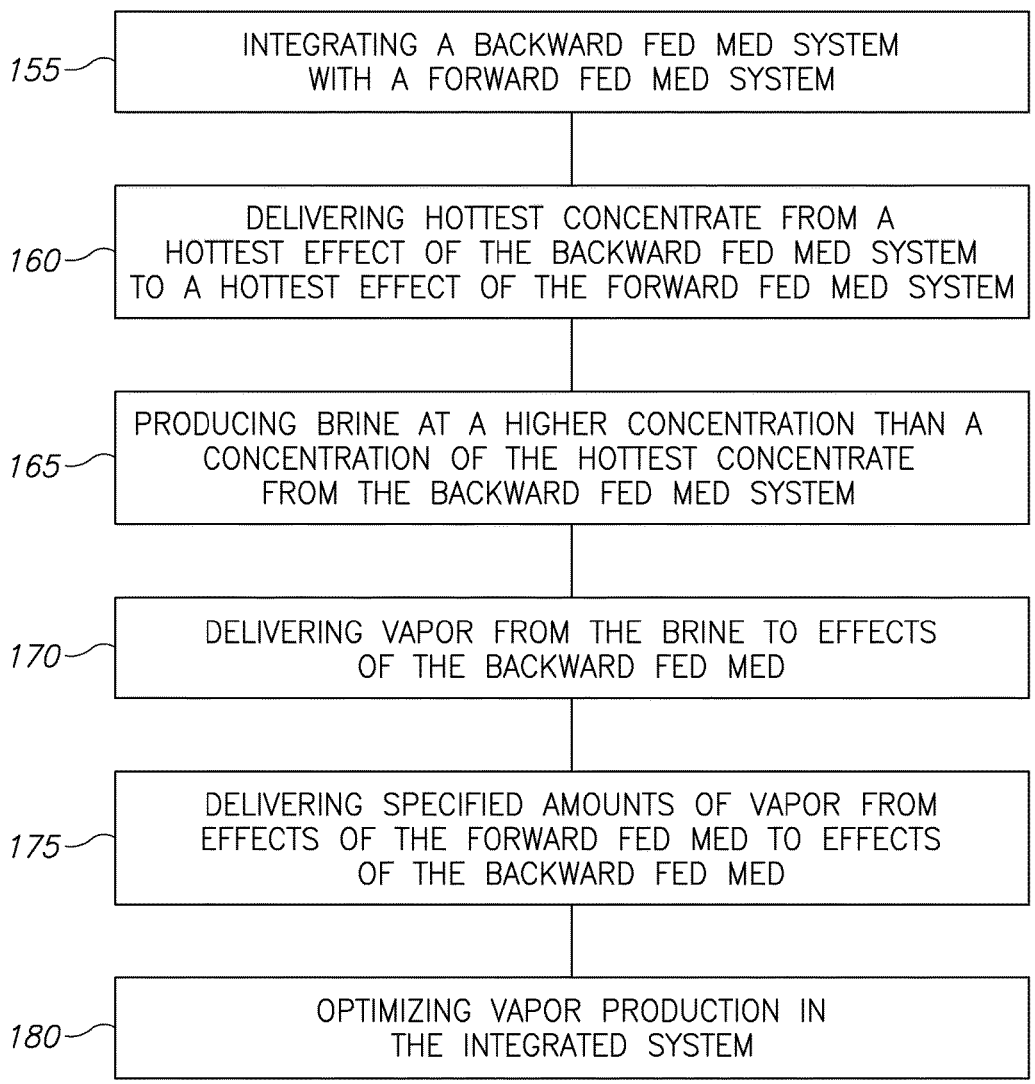
FIG. 4 is a high level flowchart illustrating a distillation method, according to some embodiments of the invention.

FIG. 4 is a high level flowchart illustrating a distillation method 150, according to some embodiments of the invention. Distillation method 150 comprises the following stages: integrating a backward fed MED system with a forward fed MED system (stage 155), by delivering hottest concentrate from a hottest effect of the backward fed MED system to a hottest effect of the forward fed MED system (stage 160), to produce brine of a higher concentration than a concentration of the heated concentrate from the backward fed MED system (stage 165). Distillation method 150 may further comprise delivering vapor from the brine to effects of the backward fed MED (stage 170) and delivering specified amounts of vapor from effects of the forward fed MED to effects of the backward fed MED (stage 175) to optimize vapor production in the integrated system (stage 180).

Advantageously, the present invention delivers the hot concentrate 95C to forward fed MED 90, and delivers the vapour in parallel to both MED units (109 and 119 in FIG. 3). This is contrast with prior art GB 1174423 which delivers cooled brine to the forward fed MED, and delivers vapour serially between the MED units. Using the hot concentrate instead of cooled brine allows reaching a higher concentration of the final brine, and delivering the vapour in parallel allows using a greater number of effects in the system. Both aspects contribute to achieving a higher recovery rate. A supplementary advantage is the ability to work with a warmer cold water source in the condenser which enables the operation of the system in warmer regions than possible with the prior art (as the exiting vapour is warmer).

As a result of the above, forward fed MED 90 in the present invention operates over a larger temperature range in respect to the prior art, as it receives hotter concentrate and hotter vapor (reaching e.g. 60-80° C., such as ca. 70° C.). The higher temperature allows using more effects with a higher recovery rate and a more concentrated resulting brine, as well as utilizing the higher heat transfer coefficients, in respect to the prior art.

The system and method may be utilized to desalinate seawater, as well as to treat water from other sources, such as brackish water, industrial effluent, waste water, produced water, rejects from different processes, etc. The exact operation conditions may be adjusted according to the exact characteristics of the feed water and the required level of water extraction therefrom.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention.

What is claimed is:

1. A compound multi effect distillation (MED) system comprising:
    a backward fed MED system, comprising a condenser arranged to heat feed water and deliver the heated feed water to a coolest effect in the backward fed MED system, wherein each effect in the backward fed MED system is arranged to evaporate water from received feed water and deliver heated brine concentrate to a warmer effect, to yield a hottest brine concentrate from a hottest effect of the backward fed MED system;
    a forward fed MED system, arranged to deliver the hottest concentrate obtained from the hottest effect of the backward fed MED system, to a hottest effect in the forward fed MED system, wherein each effect in the forward fed MED system is arranged to evaporate water from received concentrate and deliver cooled concentrate to a colder effect, to yield coldest and most concentrated brine from a coldest effect of the forward fed MED system; and
    a vapor transfer unit arranged to deliver specified amounts of vapor from specified effects in the forward fed MED system to specified effects in the backward fed MED system, to optimize vapor amount in the forward and backward fed MED systems;
    wherein vapour is delivered to the forward and backward fed MED systems in parallel;
    wherein the forward fed MED system further comprises a plurality of serially arranged flash chambers arranged to deliver additional vapor from the yielded most concentrated brine;
    wherein the flash chambers are arranged to deliver the additional vapor directly to the effects of the forward fed MED system.

2. The compound MED system of claim 1, wherein the forward fed MED system and the backward fed MED system are arranged to operate at a same maximal temperature of their respective hottest effects.

3. The compound MED system of claim 1, wherein the forward fed MED system is arranged to operate at a higher maximal temperature than the backward fed MED system, in respect to their respective hottest effects.

4. The compound MED system of claim 1, wherein: the hottest concentrate from the hottest effect of the backward fed MED system has a double concentration in respect to the feed water, and the coldest most concentrated brine from a coldest effect of the forward fed MED system has a threefold concentration in respect to the feed water.

5. The compound MED system of claim 1, wherein the condenser of the backward fed MED system is a falling film condenser.

6. The compound MED system of claim 1, wherein the forward fed MED system further comprises a forced circulation condenser arranged to receive and condense residual vapor from the coldest effect of the forward fed MED system.

7. The compound MED system of claim 1, wherein the feed water is sea water.

8. The compound MED system of claim 1, wherein the feed water is waste water or brackish water.

9. The compound MED system of claim 1, wherein the forward fed MED system does not have a condenser or forward feed heater.

10. A compound multi effect distillation (MED) system comprising:
    a backward fed MED system, comprising a condenser arranged to heat feed water and deliver the heated feed water to a coolest effect in the backward fed MED system, wherein each effect in the backward fed MED system is arranged to evaporate water from received feed water and deliver heated brine concentrate to a warmer effect, to yield a hottest brine concentrate from a hottest effect of the backward fed MED system;
    a forward fed MED system, arranged to deliver the hottest concentrate obtained from the hottest effect of the backward fed MED system, to a hottest effect in the forward fed MED system, wherein each effect in the forward fed MED system is arranged to evaporate water from received concentrate and deliver cooled concentrate to a colder effect, to yield coldest and most concentrated brine from a coldest effect of the forward fed MED system; and a vapor transfer unit arranged to deliver specified amounts of vapor from specified effects in the forward fed MED system to specified effects in the backward fed MED system, to optimize vapor amount in the forward and backward fed MED systems;

wherein vapour is delivered to the forward and backward fed MED systems in parallel;

the vapor transfer unit connects to the forward fed MED between its hottest effect and its coldest effect, and the vapor transfer unit connects to the backward fed MED between its hottest effect and its coldest effect.

11. The compound MED system of claim 10, wherein the forward fed MED system further comprises a plurality of serially arranged flash chambers arranged to deliver additional vapor from the yielded most concentrated brine.

12. The compound MED system of claim 11, wherein the flash chambers are arranged to deliver the additional vapor directly to the effects of the forward fed MED system.

13. The compound MED system of claim 11, wherein the flash chambers are arranged to deliver the additional vapor to the effects of the backward fed MED system.

14. The compound MED system of claim 10, wherein the feed water is sea water.

15. The compound MED system of claim 10, wherein the forward fed MED system further comprises a forced circulation condenser arranged to receive and condense residual vapor from the coldest effect of the forward fed MED system.

16. The compound MED system of claim 10, wherein the hottest concentrate from the hottest effect of the backward fed MED system has a double concentration in respect to the feed water, and the coldest most concentrated brine from a coldest effect of the forward fed MED system has a threefold concentration in respect to the feed water.

17. The compound MED system of claim 10, wherein the forward fed MED system does not have a condenser or forward feed heater.

18. The compound MED system of claim 10, wherein the forward fed MED system and the backward fed MED system are arranged to operate at a same maximal temperature of their respective hottest effects.

19. The compound MED system of claim 10, wherein the forward fed MED system further comprises a plurality of serially arranged flash chambers arranged to deliver additional vapor from the yielded most concentrated brine and the flash chambers are arranged to deliver the additional vapor directly to the effects of the forward fed MED system.

20. A distillation method comprising:
integrating a backward fed MED system with a forward fed MED system, by delivery of hottest concentrate from a hottest effect of the backward fed MED system to a hottest effect of the forward fed MED system in the absence of a condenser or a forward feed heater in the forward fed MED system, to produce brine at a higher concentration than a concentration of the hottest concentrate from the backward fed MED system;
delivering vapor to both the forward fed and backward fed MED systems in parallel and delivering specified amounts of vapor from specified effects in the forward fed MED system to specified effects in the backward fed MED system to optimize vapor amount in the forward and backward fed MED systems;
delivering additional vapor from coldest and most concentrated brine from a coldest effect of the forward fed MED system via a plurality of serially arranged flash chambers directly to the effects of the forward fed MED system.

* * * * *